US008740707B1

(12) United States Patent
Kaldahl

(10) Patent No.: US 8,740,707 B1
(45) Date of Patent: Jun. 3, 2014

(54) VIDEO GAME CONTROLLER FOR MULTIPLE USERS

(71) Applicant: Brad Kaldahl, Iowa City, IA (US)

(72) Inventor: Brad Kaldahl, Iowa City, IA (US)

( * ) Notice: Subject to any disclaimer, the term of this patent is extended or adjusted under 35 U.S.C. 154(b) by 0 days.

(21) Appl. No.: 14/181,958

(22) Filed: Feb. 17, 2014

Related U.S. Application Data

(63) Continuation-in-part of application No. 13/936,812, filed on Jul. 8, 2013, and a continuation-in-part of application No. 13/547,754, filed on Jul. 12, 2012, now Pat. No. 8,540,572, and a continuation of application No. 13/277,013, filed on Oct. 19, 2011, now Pat. No. 8,523,674.

(51) Int. Cl.
*A63F 9/24* (2006.01)

(52) U.S. Cl.
CPC ......................................... *A63F 9/24* (2013.01)
USPC .......................................................... 463/37

(58) Field of Classification Search
None
See application file for complete search history.

(56) References Cited

U.S. PATENT DOCUMENTS

| | | |
|---|---|---|
| 4,302,011 A | 11/1981 | Pepper |
| 4,358,118 A | 11/1982 | Piapp |
| 4,401,304 A | 8/1983 | Hamano |
| 5,213,338 A | 5/1993 | Brotz |
| 5,262,777 A | 11/1993 | Low et al. |
| 5,421,590 A | 6/1995 | Robbins |
| 5,618,045 A | 4/1997 | Kagan et al. |
| 5,967,897 A | 10/1999 | Tohyama |
| 6,102,802 A | 8/2000 | Armstrong |
| 6,620,043 B1 | 9/2003 | Haseltine |
| 6,758,753 B1 | 7/2004 | Nagata |
| 6,811,491 B1 | 11/2004 | Levenberg |
| 7,474,296 B2 * | 1/2009 | Obermeyer et al. .......... 345/156 |
| 7,628,404 B2 | 12/2009 | Elvidge |
| 8,062,126 B2 | 11/2011 | Marks et al. |
| 8,100,770 B2 | 1/2012 | Yamazaki et al. |
| 8,308,562 B2 * | 11/2012 | Patton ............................. 463/36 |
| 2002/0094864 A1 * | 7/2002 | Ting ................................ 463/30 |
| 2004/0063480 A1 | 4/2004 | Wang |
| 2004/0207597 A1 | 10/2004 | Marks |
| 2004/0229685 A1 * | 11/2004 | Smith et al. ..................... 463/29 |
| 2005/0151725 A1 | 7/2005 | Jennings |
| 2006/0183545 A1 | 8/2006 | Jourdian |
| 2006/0252532 A1 | 11/2006 | Stovall |
| 2007/0066394 A1 | 3/2007 | Ikeda et al. |
| 2007/0080222 A1 * | 4/2007 | Inubushi et al. .............. 235/439 |

(Continued)

FOREIGN PATENT DOCUMENTS

CN 2245231 Y 1/1997
JP 09168669 A 6/1997

OTHER PUBLICATIONS

"X-Gaming USB Joystick: a two-player arcade controller for your PC," George Wong, published Mar. 27, 2012, URL http://www.ubergizmo.com/2012/03/x-gaming/usb-joystick/, 2 pgs.

*Primary Examiner* — William Brewster
*Assistant Examiner* — Jason Skaarup
(74) *Attorney, Agent, or Firm* — Wendy K. Marsh

(57) ABSTRACT

The present invention provides a video game controller and apparatus that may be used by two or more players. The users physically manipulate the control device cooperatively to the kinesthetic feedback of the other player(s) to control the events of the video game. By working together through orientation of the controller, the players can jointly move the video game object on the screen and/or govern the play of the game.

8 Claims, 6 Drawing Sheets

(56) References Cited

U.S. PATENT DOCUMENTS

| | | |
|---|---|---|
| 2007/0207858 A1* | 9/2007 | Breving .................. 463/36 |
| 2007/0279380 A1 | 12/2007 | Murillo |
| 2008/0081692 A1* | 4/2008 | Pope et al. .............. 463/31 |
| 2008/0224412 A1 | 9/2008 | Newman-Bluestein |
| 2008/0261693 A1 | 10/2008 | Zalewski |
| 2009/0005164 A1 | 1/2009 | Chang |
| 2009/0025024 A1 | 1/2009 | Beser et al. |
| 2010/0041454 A1 | 2/2010 | Huang |
| 2010/0113116 A1 | 5/2010 | Theis |
| 2010/0177051 A1 | 7/2010 | Bilow |
| 2010/0304873 A1 | 12/2010 | Markowitz et al. |
| 2011/0118018 A1 | 5/2011 | Toyoda |
| 2011/0184248 A1 | 7/2011 | Furuta et al. |
| 2011/0275436 A1 | 11/2011 | Kidakarn |
| 2012/0202597 A1 | 8/2012 | Yee et al. |

* cited by examiner

VIDEO GAME CONTROLLER FOR MULTIPLE USERS

CROSS-REFERENCE TO RELATED APPLICATION

The present application is a continuation-in-part application of U.S. Ser. No. 13/936,812 filed Jul. 8, 2013, which is a continuation-in-part application of U.S. Ser. No. 13/547,754 filed Jul. 12, 2012, which is a continuation-in-part application of U.S. Ser. No. 13/277,013 filed Oct. 19, 2011, the disclosures of which are hereby expressly incorporated by reference.

BACKGROUND OF THE INVENTION

Video games are a popular form of entertainment. In 2000, Sony estimated that one out of every four households in the United States had a Sony PlayStation. Since that time, the numbers have only increased with the more recent advent of the Nintendo Wii and Microsoft Xbox.

Video games consist of manipulable images (and usually sounds) generated by a video game console which are displayed on a television or other type of screen. The game itself is usually controlled and manipulated using a handheld device connected to the console known as a controller. The controller often contains a number of buttons and directional controls each of which has been assigned a purpose for interacting with and controlled the images on the screen. Recent controllers use a camera or infrared light to allow the players' movements to control a game object. The display, speakers, console, and controls of a console can also be incorporated into one small object known as a handheld game console, such as a Nintendo DS.

Video games typically provide that each player manipulates their own or game controller which is connected to the game console by means of a wire, cord or now, more commonly, by means of wireless connection. The main function of the game controller is to control the movement or actions of the individual's playable body or object or to otherwise influence the events of the video game. Currently available games provide that each player's input on the controller or controllers is separately transmitted to the console which then generates a score based upon the ability of the player to manipulate the playable object. Camera or infrared game controllers may monitor multiple players whereby the players simultaneously play yet each player separately controls the movement or actions of their individual game object in competition against the other players.

While video games are a fun pastime, in some instances it may be desirable for people to play together towards a common goal, rather than playing a game against each other. For instance, one of the purposes of corporate retreats is for employees to participate in team building exercises and learn to work better together. Currently available video games do not fulfill this goal as they pit players against each other. It is therefore a goal of the present invention to provide a video game controller and system that allows players to physically manipulate a shared video game object or sprite cooperatively to achieve a common goal.

These and other objects of the invention will become apparent from the detailed description of the invention which follows.

SUMMARY OF THE INVENTION

According to the invention, the applicant has provided a video game controller and apparatus in which two or more players physically manipulate the control device responding cooperatively to the kinesthetic feedback of the other player (s) to control the event in the video game or simulation. The game controller may be attached to or incorporated into or onto an elongated bar, triangle, square, or ball, for instance, so that two or more people can hold onto and response kinesthetically to simultaneously operate the game controller. Alternatively, the controller may be strapped or attached to the players directly through the use of a band, strap, belt, or similar device.

In addition to or instead of using the kinesthetically controlled device, the invention further includes the use of a pressure sensitive device and/or a tension sensitive device for controlling the movement of the game object. The pressure sensitive devices are attached to or mounted on the players and require both players to press their devices together to provide input to effect gameplay. The tension sensitive devices would likewise be worn or mounted on or around the players using a belt, band, etc. and would effect gameplay be registering the amount of tension exerted on the belt or band.

The invention is further directed to a device that may be used to adapt to an existing game controller so that it is of a size suitable for two or more players to use the controller for the purposes of the invention, or to alternatively allow the controller to be jointly attached to the players so they can jointly control the movement of the controller, and therefore also the game object.

By working together through orientation of the controller and/or through manipulation of the pressure sensitive device and/or the tension sensitive device, the players can jointly manipulate the video game object on the screen and/or govern the play of the game. The invention has many applications, including for use by young, aged, and/or physically handicapped individuals who are unable to operate a controller alone. It is further useful for applications whereby teamwork is desired, such as corporate team-building exercises and games, couples' counseling, traditional or special education school classrooms, etc.

DETAILED DESCRIPTION OF THE INVENTION

The present invention relates to a video game controller for cooperative use by multiple users. The controller is sized to be operated by two or more users. During play, the users in combination must physically manipulate the control device, responding cooperatively to the kinesthetic feedback of the other player(s) to control the events in the video game or simulation. The invention is intended to serve several purposes, including encouraging teamwork by two or more players to achieve a common goal. The invention also allows people that would otherwise be unable to physically handle or manipulate a video game controller alone to play with one or more other players who, as a team, are able to manipulate the controller and play the game.

The invention may include a single controller that is manipulated by all players in the form of a bar, rod, or other controller shaped in a manner that can be easily held, pushed, or otherwise maneuvered by two or more people. For instance, the controller can by two players in one or both of each player's hands. Or, the controller may be a ball or other device that can be pushed by two or more players on the floor or large surface. The latter type of device is especially advantageous for one or more players that have difficulty holding a conventional controller, such as persons that are wheelchair-bound.

Figure 1:
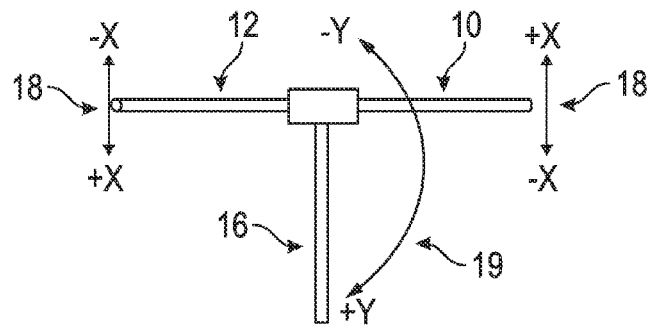
FIG. 1 is a perspective view showing one embodiment of the controller of the invention designed for three players. The unit is a three person, on-axis controller.

While not intending to be limiting, FIGS. 1-4 illustrate various possible embodiments of the controller of the invention. For instance, FIG. 1 shows one potential embodiment of the controller in the shape of a T-bar 10 whereby up to three users can each hold onto one of the bars 12, 14 and/or 16. The T-Bar includes an X axis 18 and Y axis 19 for sensing the orientation of the controller 10 in horizontal and vertical planes, respectively.

Figure 2:
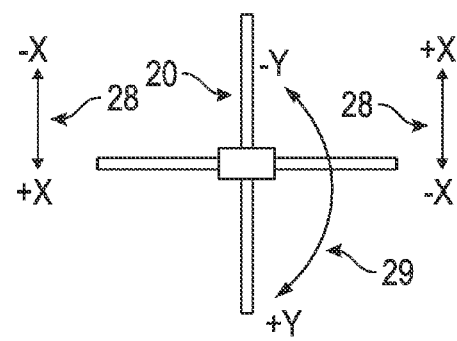
FIG. 2 is a perspective view showing an alternative embodiment of the controller of the invention designed for four players. The unit is a four person, on-axis controller.
Figure 3:
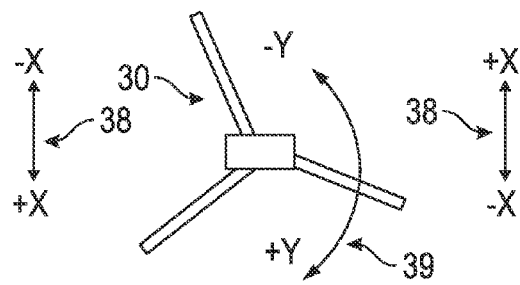
FIG. 3 is a perspective view showing an alternative embodiment of the controller of the invention designed for three players. The unit is a three person, off-axis controller.
Figure 4:
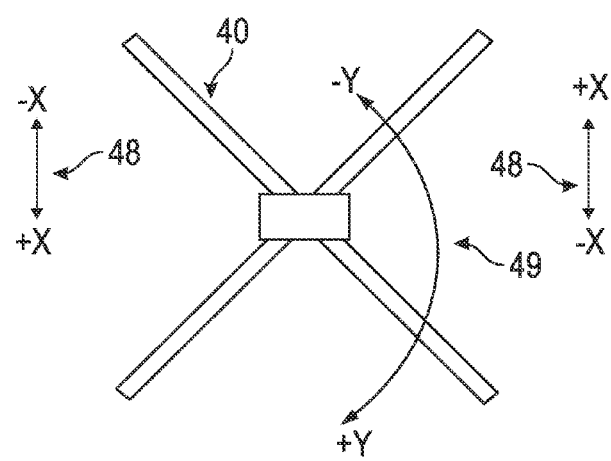
FIG. 4 is a perspective view showing an alternative embodiment of the controller of the invention designed for four players. The unit is a four person, off-axis controller.

FIGS. 2-4 show similar alternative embodiments of the controller 20, 30, and 40, respectively, whereby the controller is either oriented on axis (FIGS. 1 and 2) or off axis (FIGS. 2 and 3). The controllers of FIGS. 2-4 also include an X axis 28, 38, and 48, respectively, and a Y axis 29, 39, and 49, respectively.

Figure 5:
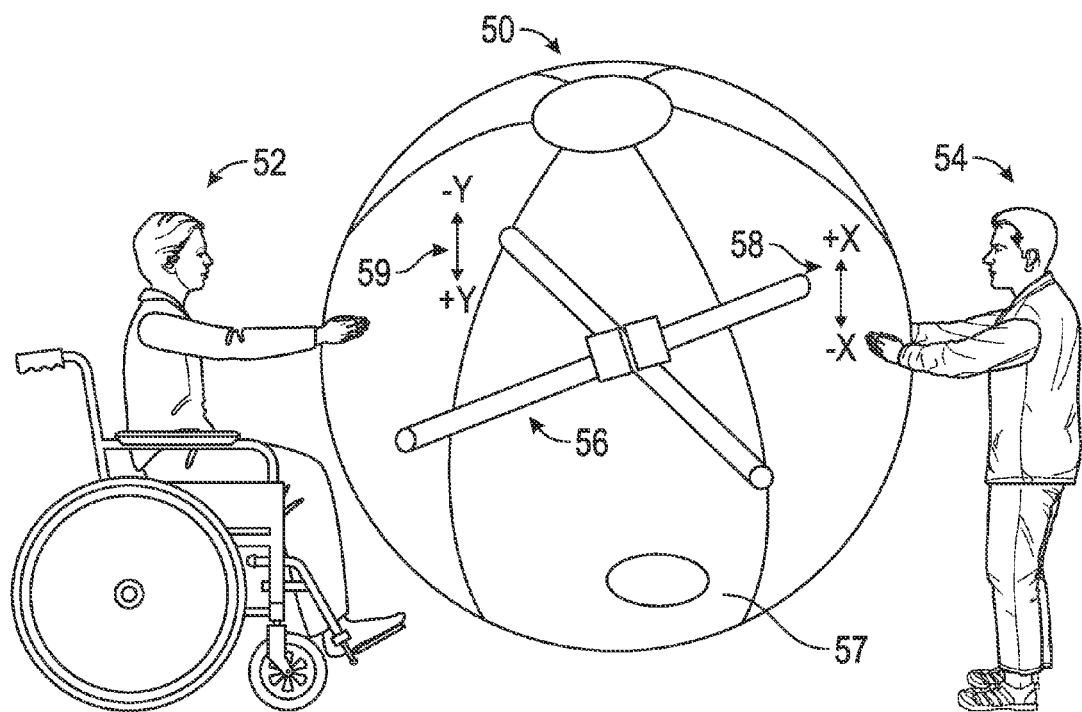
FIG. 5 is a perspective view showing an alternative ball-shaped embodiment of the controller designed for two or more players.

FIG. 5 further shows yet another possible embodiment whereby the outer portion of the controller 50 is in the shape of a ball that can be jointly manipulated by two or more players 52 and 54, whereby a T-Bar device 56 having an X axis 58 and Y axis 59 is provided inside the ball 50 for sensing the orientation of the controller. A weight 57 is further included inside the ball 50 to help keep the ball 50 centered during play.

Figure 6:
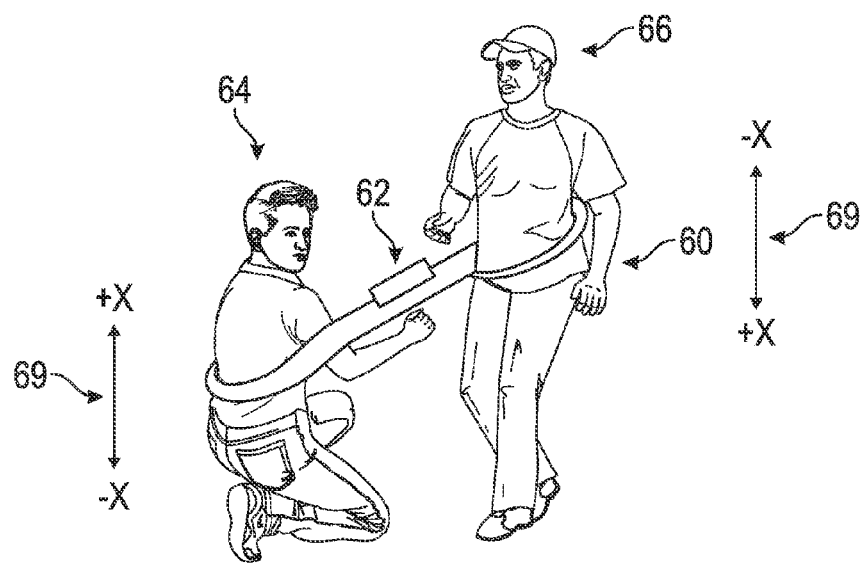
FIG. 6 is a perspective view of an alternative embodiment of a device for adapting an existing controller for multiple-person play via the use of a belt of strap.

The controller may also, for instance, be attached to the players' body (or body parts) such as through the use of connected waist bands, belts, headbands, a belt that surrounds and encompasses the users, ankle bands, leg straps, etc. so that the sensory collaboration of physical movement of the players will simultaneously influence the events in the game, as shown in FIG. 6.

A prior art controller that is designed for only one person play for multiple person play may also be adapted for use in accordance with the invention. For instance, a regular controller may be inserted within or fitted inside a larger device to increase the gripping surface of the controller, thus allowing the controller to be more easily held by two or more players for simultaneous game play. The enlarging device may be made in a variety of colors, materials, and/or designs that are aesthetically pleasing to the players, and may further include features to improve the ability of players to hold onto the controller, such as surface ribbing or bumps, or even slots in which the players can rest their fingers.

For physically challenged individuals, the adapting device may be designed with accommodating features for weak or less functional fingers to help secure their fingers or hands to the controller through the device, such as with the inclusion of a glove, pocket, or even rings through which the player(s) can insert his/her fingers. These same types of features may further be included in the design of the controller made in accordance with the invention. The device may also optionally include cushioning or other features that may the device and controller more comfortable to hold. Such features are well known and understood by persons skilled in the art.

The adapting device should be designed in a manner for comfort and/or style while also allowing the users to control the game object through motion of the controller. For instance, if the controller employs buttons or a keypad, the adapting device must also allow the players access to the control buttons or keypad to control the game object. If the controller employs laser tracking, such as a Wii controller, then the adapting device must include an opening for the laser from the controller to communicate with the console or CPU.

In still another embodiment as shown in FIG. 6, the adapting device 60 may simply be a belt or strap that is wrapped around or otherwise attaches to the controller 62 and then also to at least one portion of each of the players 64 and 66 so that the movements of the players 64 and 66 control the movements of the controller 62 and likewise the game object (not shown). In this regard, the device may be a "fanny pack" type device with a pocket or compartment in which the controller may be inserted while also including a belt for wrapping the device around the players.

Figure 7:
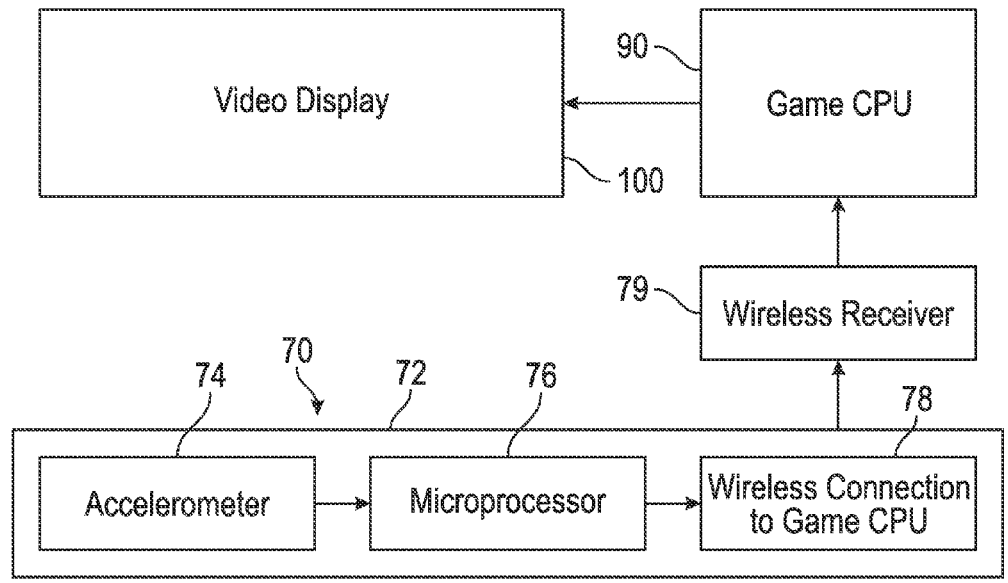
FIG. 7 is a block diagram showing electrical circuit structure of this embodiment.

With reference to FIG. 7, the invention should include conventional video game features that are well known in the art to enable the users through the controller (Multiplayer Control Unit (MCU)) 70 to control a game object (not shown) on a video display unit 70, such as a television or computer monitor. In this regard, the controller 70 may include a conventional housing 72 in which at least one accelerometer 74 is mounted and configured to measure the movement and orientation of the controller 70 along each of one (x), two (x and y) or three (x, y, and z) axe(s) over time. The accelerometer 74 is preferably a three-axis linear accelerometer that detects linear acceleration along each of an X axis, Y axis and Z axis. Alternatively, a one-axis or two-axis linear accelerometer may be used in another embodiment depending on the type of control signals desired. Any suitable accelerometer technology now existing or later developed may be used to provide the accelerometer 74.

The accelerometer 74 communicates with a microprocessor 76. The microprocessor 76 communicates via a wireless connection to the wireless receiver 78 which in turn is configured to communicate with a game console or computer 90 by wire (not shown) or via a wireless receiver 79. The CPU 90 produces a video display signal which is used with the video display device 100 to display the video game. The CPU 90 may be part of a game console of any type, including Wii, Playstation, Xbox, etc., or part of a computer or lap top.

As already noted, the controller of the present invention includes a housing molded of plastic or metal, for example. The housing has a holding portion and is of a size capable of being held by at least one hand each of two or more adults and/or children. The shape of the housing is not limited to a rectangular shape but may also be in the shape of an oval, circle, rod, a t-bar (as shown in FIGS. 1 and 2), a cross (as shown in FIGS. 3 and 4), a ball (as shown in FIG. 5), or the like. Likewise, its cross-section shape is not limited to a rectangle and may be a circle or other polygon.

The adapting device of the invention is also not limited in terms of size or shape so long as it is also of a size capable of being held by at least one hand each of two or more adults and/or children, and may therefore also be of any polygonal shape or may also be a t-bar, for example. The adapting device must also include means by which to house or fasten the prior art controller within or on itself, such as by a strap, belt, or casing in which the controller sits in or is housed. As also already noted, the adapting device may simply consist of a strap or belt that attaches to the controller and also to the players so that the joint motion of the players causes the controller to move likewise.

The housing may optionally include a power switch to remotely turn on or off an electric power source to a game machine by a remote operation. For wireless use, a battery cover is conventionally detachably attached to the lower housing to form a holding portion in which batteries are stored. Thus, the controller may operate with a battery as a power source or by wired connection to the console.

As noted, the controller of the present invention can be used with a conventional video game console, such as Wii, Playstation, Xbox, etc., by merely connecting the connector of the controller to a predetermined port of the conventional video game console. Alternatively, the controller may be used with a computer PC or laptop. The above described controller sufficiently carries out the functions as a game operating device by itself.

In practice, two or more players jointly hold the controller of the invention in their hands and/or attach the controller to their bodies in some manner. During play of the video game, the players have to cooperatively work together to move the controller in a manner to achieve the desired motion of the object on the video game display. In this regard, the accelerometer will sense the orientation of the controller as the players cause it to move and transmit this information to a game console or CPU, which in turn will transmit this information to the video display, resulting in motion of the game object in a manner consistent with the movement and control the motion of the game object on the screen or display. More particularly, the accelerometer inside the controller senses the joint motion of the controller by the players and sends a signal to the game console or CPU which translates the cumulative motion from the controller to the motion of the object on the screen.

Figure 8:
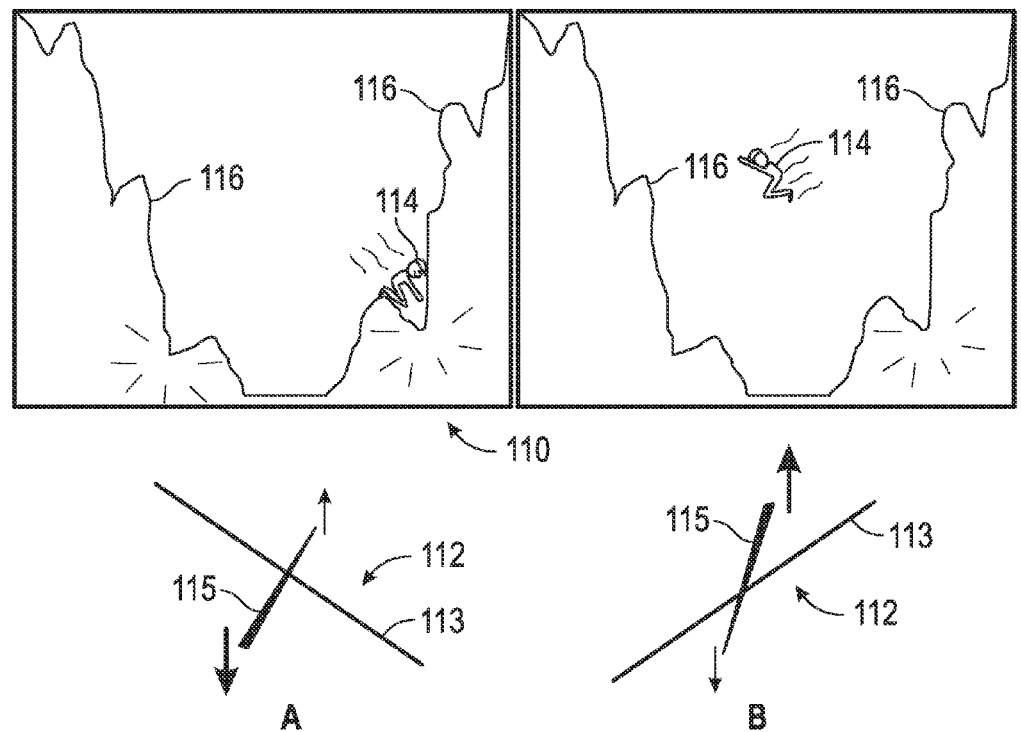
FIG. 8 is a diagram illustrating how a potential multi-player controlled game of the present invention might appear.

While the controller of the present invention may be adapted for use with conventional video games and video game consoles, there are certain types of games that are especially conducive for multiple person simultaneous play in accordance with the invention. Such a game is illustrated by FIGS. 8A and B which show a two-axis mountain-climber game 110 whereby the players (not shown) must simultaneously manipulate a controller 112 to move the game object 114, in this case a mountain climber, up and down the mountain side 116 to obtain points. The players would collaboratively move the x-axis 113 of the controller 112 left or right to move the mountain climber 114 to the left or right side of the mountain 116 and/or move the y-axis 115 of the controller 112 up or down to move the mountain climber 114 up and down the side of the mountain 116. Alternatively, with a one-axis controller (not shown) the players can move the mountain climber 114 up or down the mountain side 116 by raising or lowering the controller, respectively.

In another potential game envisioned especially for use with the invention (not shown), players draw a card that has on it a shape that the players must try to collaboratively draw on the screen.

The present invention further includes other features designed to accommodate cooperative play between the players. One such feature is a tension sensitive device (TSD) which measures the amount of pressure cooperatively exerted on the device by the players which in turn translates into movement of the game object on the screen. The TSD may be attached or mounted to a strap, belt, Velcro etc. that can be wrapped around one of more portions of each of the players' bodies and which detects the amount of tension placed on the belt or strap by the players as they move together and apart. The TSD acts as either a switch that is turned on and off, like a mouse click, or is a device like a potentiometer that measures the variable amount of pressure exerted by the players on the belt and provides variable input to effect the gameplay.

Figure 9:
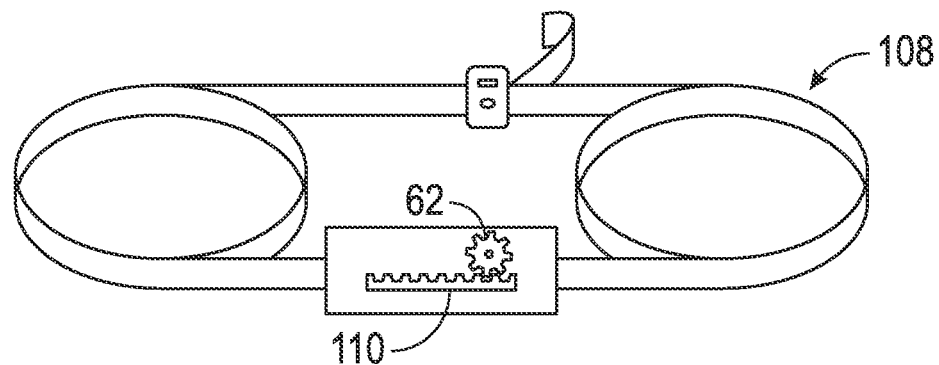
FIG. 9 is a perspective view of a preferred embodiment of the tension sensitive device of the invention.
Figure 10:
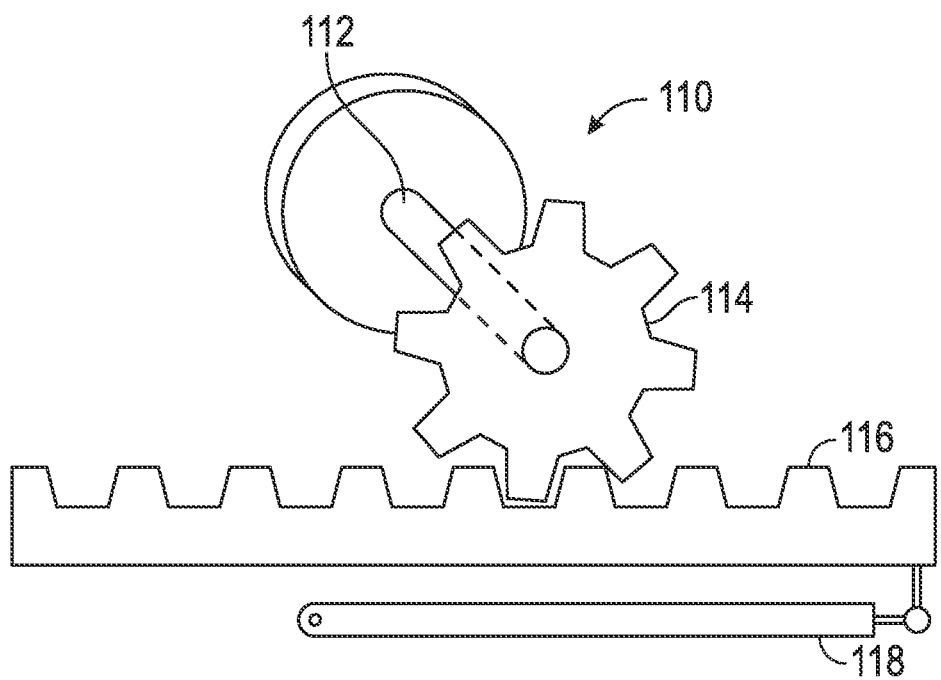
FIG. 10 illustrates the rack and pinion system inside the tension sensitive device of FIG. 9.

FIG. 9 shows a preferred embodiment of the TSD which includes a variable resistance potentiometer 110 to measure the amount of tension or pressure placed by the players on a belt or strap 108 which is wrapped around one or more portions of each player's body. The tension measured is then communicated wirelessly or otherwise to the game CPU which in turn provides corresponding control and movement to the game object. FIG. 10 shows the inside of the potentiometer 110 of FIG. 9, which includes a control shaft 112 that mounts a pinion 114. A gear rack 116 engages the pinion 114 to rotate the control shaft in response to relative movement of the rack 116 and pinion 114, whereby the rack 116 and pinion gear 114 measure the tension or resistance placed by the players on the belt 108. An elastic band 118 returns the potentiometer 110 to zero when compressed by activating the rack 116 and pinion 114 which in turn activate the potentiometer 110.

Figure 12:
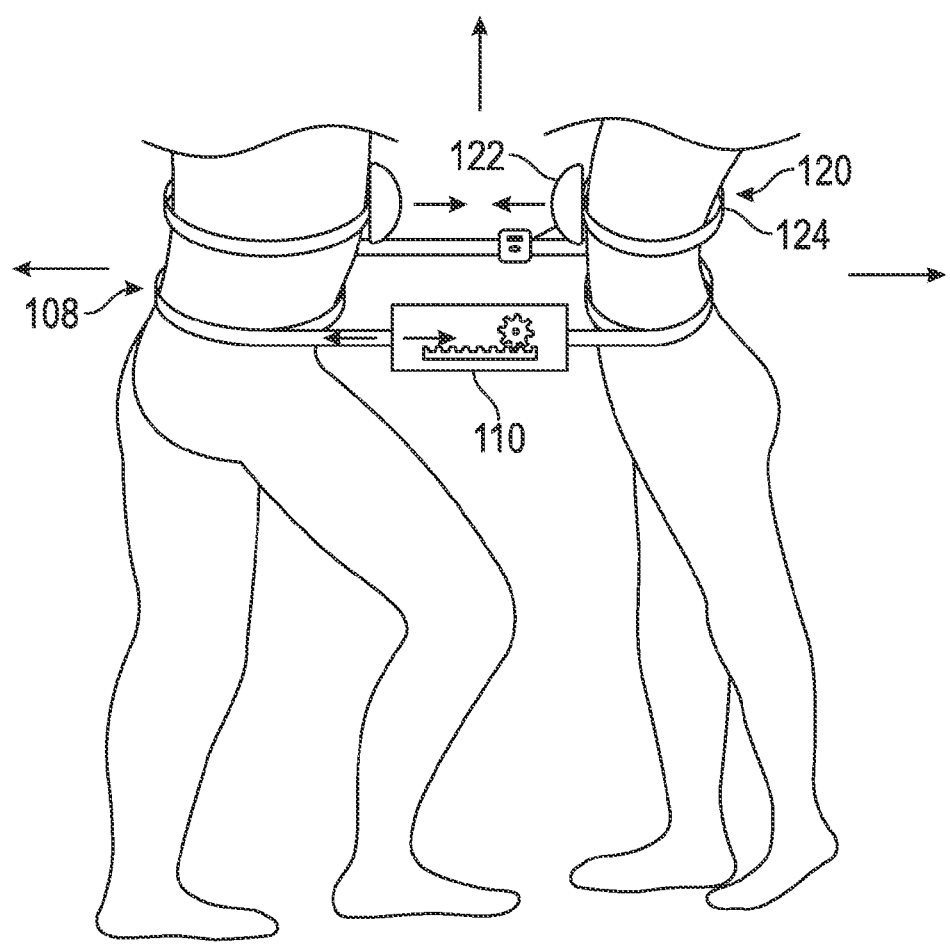
FIG. 12 is a perspective view of the tension sensitive device of FIG. 9 as shown on the players along with the variable resistance pressure switch of FIG. 11.

The belt or strap 108 can be placed on many parts of the players' bodies and fastened via conventional means, such as with Velcro®, snaps, belt buckle, or the like. For example, the strap(s) can be placed on a leg of each player so that the players have to pull their legs apart in order to engage a particular game action or function. The strap may also be placed around other players' parts such around their forearms, chests, hips, abdomens, etc. FIG. 12 shows the TSD of FIGS. 9 and 10 placed around the waists of two players.

As another means of cooperative game play, the invention may also include a pressure sensitive device (PSD) which requires the players to press together in order to turn on or off the PSD. The PSD may include any device capable of measuring pressure exerted by the players, such as a switch, pad, button, etc. which provides variable input to the game CPU, such as a variable resistance pressure switch. The variable resistance switch may include an air bladder or weight scale mechanism to measure on/off pressure or amount of pressure depending on the game design. The PSD may be attached directly to the players' clothing or skin or may be attached to a belt, strap, or other device that goes around one or more of each of the players' body parts, including their heads, arms, legs, waists, abdomens, etc.

Figure 11:
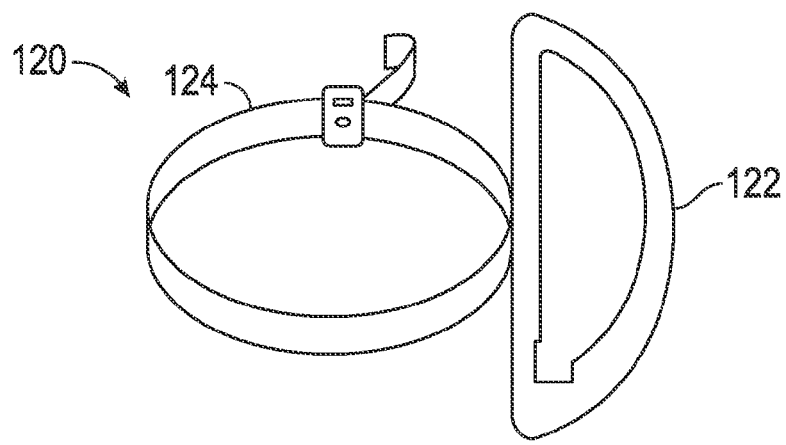
FIG. 11 illustrates a preferred embodiment of a pressure sensitive device which consists of a variable resistance pressure switch.

A preferred embodiment of the PSD 120 using an air bladder is shown in FIG. 11. The air bladder 122 shown is attached to a belt or strap 124 which in turn encircles the waist, abdomen, or other body part of the player. FIG. 12 shows the PSD 120 on a strap 124 that is wrapped around the players' waists. Alternatively, the PSD 120 could be mounted on the players' foreheads (not shown) so the players would need to push their foreheads together to engage a particular game action. The surface of the PSD is preferably covered with some type of cloth, denim, padding, rubber, or other non-slip material to enable contact between the players and to protect the devices. Inside the PSD is a switch, mouse, or other device that measures the variable amount of pressure placed on the device by the players which is then communicated wirelessly or otherwise to the game CPU which in turn determines the movement of one or more game objects on the screen.

Figure 13:
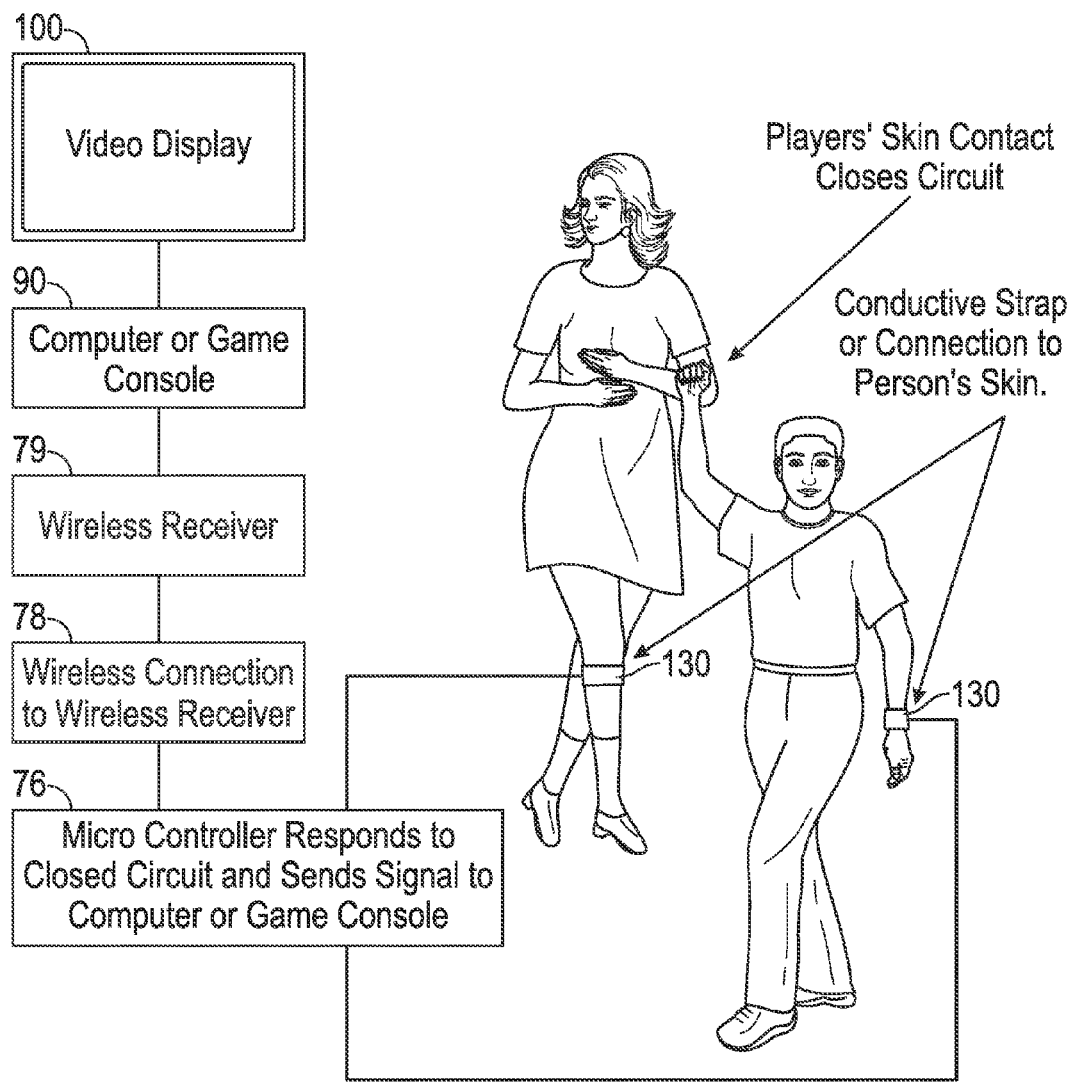
FIG. 13 illustrates a preferred embodiment of a variation of the invention which includes a conductive strap that is used to control game play.

FIG. 13 illustrates another variation of cooperative game play, whereby the invention includes an antistatic wrist strap 130, belt, band, or other conductive material that is attached directly to the skin of each player in some manner, such as around the ankle, wrist, leg, arm, head, abdomen, etc. or, alternatively, could be held by each player. Any conductive material is suitable for this purpose including, but not limited to, metals, such as copper and aluminum, graphite, conductive polymers, and/or gel electrode material.

The conductive strap 130 communicates with the microcontroller 76 (wirelessly or otherwise) which in turn is configured to communicate with a CPU or game console 90 by wire (not shown) or via the wireless receiver 79. The CPU 90 produces a video display signal which is used with the video display device 100 to display the video game. When a player touches another player on the skin, such as touching the other player on the arm, for example (as shown in FIG. 13), the body's conductivity closes a circuit in the microcontroller 76. Once the circuit has closed, the microcontroller 76 sends a signal to the computer or game console 90 which in turn displays a video game having at least one game object that responds in accordance with the signal provided by the microcontroller.

Such a device could be used during couples' therapy whereby, for example, one person draws a card from a deck and the card indicates where that player is required to touch the other player during the video game.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

What is claimed is:

1. A video game system for cooperative play by two or more players comprising:
   a first conductive material attached to or in contact with a first player's body and a second conductive material attached to or in contact with a second player's body;
   a microcontroller in communication with the first and second conductive materials, said microcontroller further being in communication with a computer processing unit (CPU) or a game console;
   whereby skin of the first player touching skin of the second player closes a circuit between the first and the second conductive materials and the microcontroller, said circuit closing causing the microcontroller to send a signal to the CPU or the game console thereby causing said CPU or game console to display a video game having at least one game object that responds in accordance with the signal.

2. The video game system of claim 1 whereby the first conductive material comprises a belt or a strap that is wrapped around a portion of the first player's body.

3. The video game system of claim 1 whereby the second conductive material comprises a belt or a strap that is wrapped around a portion of the second player's body.

4. The video game system of claim 1 whereby the first conductive material and the second conductive materials are antistatic straps.

5. The video game system of claim 1 whereby the first conductive material is held by the first player.

6. The video game system of claim 1 whereby the second conductive material is held by the second player.

7. The video game system of claim 1 whereby the first conductive material is selected from the group consisting of a metal, graphite, conductive polymer, and gel electrode material.

8. The video game system of claim 1 whereby the second conductive material is selected from the group consisting of a metal, graphite, conductive polymer, and gel electrode material.

* * * * *